June 13, 1939.    L. KASEHAGEN ET AL    2,162,221
TREATMENT OF COAL
Filed March 30, 1937
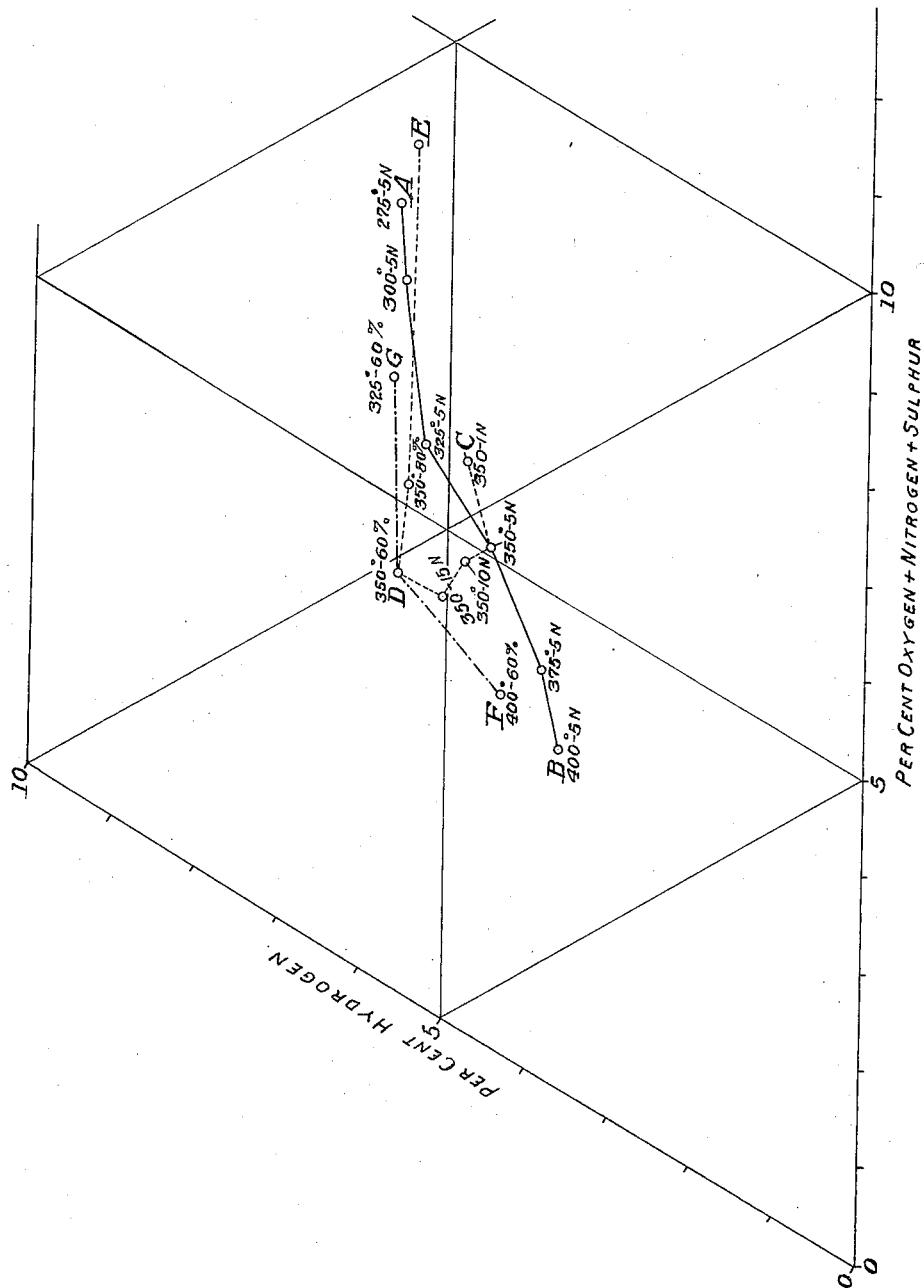
INVENTORS
Homer H. Lowry
Leo Kasehagen
By Stebbins, Blenko & Parmelee
THEIR ATTORNEYS ial for hydrogenation would appear to increase
UNITED STATES PATENT OFFICE 2,162,221

TREATMENT OF COAL

Leo Kasehagen and Homer H. Lowry, Pittsburgh, Pa., assignors to Carnegie Institute of Technology, Pittsburgh, Pa., a corporation of Pennsylvania Application March 30, 1937, Serial No. 133,802

2 Claims. (Cl. 44—1)

This invention is for improvements in or relating to the treatment of coal. Our invention includes a process for the treatment of coal by heating it, preferably crushed to 16 to 20 mesh (Tyler Standard Screen Scale) with an aqueous solution of an alkali at a temperature above a certain minimum in a closed pressure vessel lined with a suitable material, as for example, nickel or silver, which will resist the action of the hot alkali.

When coal is heated under these conditions, certain reactions occur which result in the conversion of the major part of the coal to a coke-like product hereinafter called a residue. The residue is a very porous and dark colored material and it contains a lower percentage of oxygen than the original coal. Less hydrogen would, therefore, be required for hydrogenating this residue than for hydrogenating the untreated coal itself, since less hydrogen would be used in hydrogenating the oxygen which is present to the waste product water. It follows that under certain conditions it may be desirable to treat coal in this manner before it is subjected to hydrogenation. We have also found that the treatment of coal by first changing it to a residue under certain conditions and then subjecting it to hydrogenation results in the formation of substances differing from those which are obtained when coal is treated by the ordinary hydrogenation process. The substances so produced are oily in character rather than sticky, as are the products of hydrogenation of the coal itself.

In general, the treatment is carried out by heating the crushed coal with a suitable aqueous alkali solution, such as an aqueous solution of an alkali metal hydroxide, in a suitable pressure vessel maintained at the desired temperature for a determined period of time. We have found that the composition of the residue, which determines the value of the treatment, depends chiefly upon the temperature employed and the alkali solution concentration and to some extent on the length of time of the treatment. We have determined that there is practically no appreciable reaction below a certain minimum temperature and above this temperature the percentage of oxygen in the residue decreases as the temperature of the treatment is increased, so that from the standpoint of decreasing oxygen percentage alone, the value of the residue as a starting material for hydrogenation would appear to increase as the temperature at which the treatment is conducted increases. However, when an alkali solution of low concentration is used, not only has the residue a lower percentage of oxygen, but also a lower percentage of hydrogen than is found in the original coal, and this lowering of the hydrogen percentage becomes greater as the temperature of the treatment is increased. Such an effect tends to nullify the improvement and advantages brought about by the treatment in lowering the oxygen percentage.

We have discovered that when alkali solutions of higher concentrations are used in the treatments, the residues have lower percentages of oxygen than the coal had originally, and the lowering of the hydrogen percentage is minimized to such an extent that for the optimum alkali solution concentration and at certain temperatures, the hydrogen percentages of the residues are practically as high as that of the original coal, while the oxygen percentages are quite considerably below that of the coal used as the starting material.

We have also found that the most effective period of treatment is in the vicinity of five hours. The most easily measured product resulting from the alkali treatment is carbon dioxide. The following table gives the rates of production of $CO_2$ when 50 grams of Edenborn coal were treated with 5N sodium hydroxide at 325° C.:

| Reaction time in hours | Rate of production of $CO_2$ in grams per hour |
|---|---|
| ¾ | 1.17 |
| 2¾ | 0.37 |
| 5½ | 0.09 |

This table shows that the reaction starts at a high velocity but decreases in velocity rapidly with time, so that the reaction is essentially complete at the end of five hours. It has also been observed that residues can be produced by merely heating to reaction temperature and allowing to cool. Residues produced in this manner have the same appearance to the eye as residues produced by holding at the reaction temperature for several hours, but lowering of the oxygen percentage is not so pronounced.

It is not feasible to set forth all the conditions necessary for the formation of the most desirable products from all coals, but the optimum conditions can readily be determined experimentally for any coal following the teachings of this invention. For example, we have found that Edenborn coal (Pittsburgh seam) forms a coke-like product or residue at about 265° C. but not at 250° C.

Edenborn coal has the composition on a dry-ash-free basis of:

| Carbon | Hydrogen | Oxygen | Nitrogen and sulphur |
|---|---|---|---|
| 84.99 | 5.68 | 7.02 | 2.31 | and the residues produced by the treatment of this coal with 16.7% sodium hydroxide solutions at the below listed temperatures for periods of from 18 to 24 hours have the following compositions:

| Temperature, °C. | Carbon | Hydrogen | Oxygen | Nitrogen and sulphur |
|---|---|---|---|---|
| 275 | 86.30 | 5.61 | 5.62 | 2.47 |
| 300 | 87.15 | 5.53 | 5.32 | 2.00 |
| 325 | 88.95 | 5.27 | 3.51 | 2.27 |
| 350 | 90.43 | 4.48 | 2.92 | 2.17 |
| 375 | 92.01 | 3.85 | 2.09 | 2.05 |
| 400 | 92.93 | 3.62 | 1.50 | 1.95 |

The lowering of the percentages of oxygen and of hydrogen from those present in the original coal may be seen quite clearly by inspection of the above table. The residues produced at about 350° C. by treating Edenborn coal with alkali solutions of the following concentrations had the following compositions:

| Sodium hydroxide, percent | Carbon | Hydrogen | Oxygen | Nitrogen and sulphur |
|---|---|---|---|---|
| 3.8 | 89.38 | 4.78 | 3.32 | 2.52 |
| 16.7 | 90.43 | 4.48 | 2.92 | 2.17 |
| 30.8 | 90.39 | 4.78 | 2.62 | 2.21 |
| 41.7 | 90.66 | 5.04 | 2.26 | 2.04 |
| 60.00 | 90.16 | 5.59 | 2.01 | 2.24 |
| 80.00 | 89.26 | 5.48 | 2.89 | 2.37 |
| 100.00 | 85.85 | 5.44 | 6.21 | 2.50 |

From the above it would appear that at about 350° C., the residue having the most desirable composition is that formed when a solution of the order of 60% of an alkali metal hydroxide such as sodium hydroxide is used. Under these conditions, the hydrogen percentage of the coal was reduced from 5.68 to 5.59, that is, 0.09%, but the oxygen was reduced from 7.02 to 2.01%, that is, 5.01%. Thus, a reduction in oxygen of 5.01% was accompanied by a reduction in hydrogen of only 0.09%. A 60% solution of sodium hydroxide used in the indicated treatments at the following temperatures produced residues having the following compositions:

| Temperature, °C. | Carbon | Hydrogen | Oxygen | Nitrogen and sulphur |
|---|---|---|---|---|
| 325 | 88.11 | 5.66 | 3.97 | 2.26 |
| 350 | 90.16 | 5.59 | 2.01 | 2.24 |
| 400 | 92.04 | 4.36 | 1.34 | 2.26 |

The above figures show that a temperature of the order of 350° C. is the optimum temperature of treatment for Edenborn coal, since a higher temperature, although bringing about a lowering of the oxygen percentage, is accompanied by a marked lowering of the hydrogen percentage and a lower temperature does not give so great a lowering of percentage of oxygen.

It is thus apparent that the optimum conditions for the prehydrogenation treatment of Edenborn coal are a temperature of the order of 350° C. and an alkali solution concentration of approximately 60% alkali metal hydroxide for a period of from about ¾ of an hour to 5½ hours.

Instead of using an aqueous solution of sodium hydroxide, we have found that an aqueous solution of potassium hydroxide will give similar results. On account of the higher cost of the potassium hydroxide at the present time, it is manifestly more economical to use a solution of sodium hydroxide, and this we prefer, although it is to be understood that we do not mean to limit our invention to the employment of only sodium hydroxide and potassium hydroxide since other alkali metal hydroxides may be used.

The data in graphical form is presented in Figure 1. This figure shows the compositions of the residues plotted on a ternary diagram. The points on line AB represent the residues formed by treatment of Edenborn coal with 5N sodium hydroxide at various temperatures in a pressure vessel. The line CDE represents the compositions of the residues obtained using various concentrations of sodium hydroxide at 350° C. The line FDG represents the residues produced by 60% sodium hydroxide at various temperatures. The three lines represent the data embodied in the three tables hereinabove set forth. While the fourth column in the tables represents the percentage of oxygen, it was necessary to use the third axis on the diagram to represent the percentage of oxygen+nitrogen+sulphur, because any point on the ternary diagram must represent three percentages which total 100. This diagram shows that the residue having the lowest percentage of oxygen+nitrogen+sulphur and at the same time a hydrogen percentage about as high as that of the coal itself is the one produced at 350° C. with 60% sodium hydroxide. This conclusion is the same as the one indicated by the three tables already mentioned. The diagram also indicates that any other conditions of temperature and/or alkali concentration would not give a residue more suitable for hydrogenation than a temperature of 350° C. and an alkali concentration of 60%.

Our present process can be carried out in a continuous manner or in batches. The coal may be of any type which is suitable for hydrogenation and the particles of coal may be of any size desired, although we believe it preferable to treat the coal while in a finely divided condition.

While we have described the preferred form of the process, it is to be understood that various modifications in the details of the procedure may be made without departing from the invention, which is not to be limited other than as in the appended claims.

We claim:

1. A treatment for reducing the oxygen content of coal, which consists of crushing the coal and heating the crushed coal with an aqueous solution of an alkali metal hydroxide ranging from about 3.8% to about 60% under pressure and at a temperature between 300° C. and 375° C. for a period from one to five hours.

2. A process for the treatment of bituminous coal for reducing the oxygen content thereof, which consists of heating the coal with an aqueous solution of an alkali metal hydroxide ranging from about 16.7% to about 60% under pressure and at a temperature between 325° C. and 375° C. for a period of from two to five hours.

LEO KASEHAGEN.
HOMER H. LOWRY.